United States Patent
Raslain

(10) Patent No.: US 12,221,984 B2
(45) Date of Patent: Feb. 11, 2025

(54) METHOD FOR CONFIGURING A DIGITAL FILTER FOR ATTENUATING A FREQUENCY ASSOCIATED WITH A TORSION MODE OF A POWER TRANSMISSION LINE OF A TURBINE ENGINE

(71) Applicant: SAFRAN AIRCRAFT ENGINES, Paris (FR)

(72) Inventor: Typhaine Raslain, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 573 days.

(21) Appl. No.: 17/610,486

(22) PCT Filed: Apr. 6, 2020

(86) PCT No.: PCT/EP2020/059808
§ 371 (c)(1),
(2) Date: Nov. 11, 2021

(87) PCT Pub. No.: WO2020/229058
PCT Pub. Date: Nov. 19, 2020

(65) Prior Publication Data
US 2022/0220979 A1    Jul. 14, 2022

(30) Foreign Application Priority Data
May 13, 2019   (FR) ...................................... 19 04965

(51) Int. Cl.
F04D 29/66    (2006.01)
B64C 27/00    (2006.01)
(Continued)

(52) U.S. Cl.
CPC ............ *F04D 29/668* (2013.01); *B64C 27/00* (2013.01); *F01D 25/04* (2013.01); *G01H 1/10* (2013.01);
(Continued)

(58) Field of Classification Search
CPC ... F04D 29/668; F04D 27/0261; B64C 27/00; B64C 27/001; F01D 25/04; F01D 1/00;
(Continued)

(56) References Cited

U.S. PATENT DOCUMENTS

2019/0031359 A1 *    1/2019    Djelassi ............... G05B 13/042

OTHER PUBLICATIONS

International Search Report issued on Jun. 5, 2020 in PCT/EP2020/059808 filed Apr. 6, 2020, 2 pages.
Wong, T.H., "Designing and Simulating the Engine Speed Governor for Helicopter Applications", International Gas Turbine and Aeroengine Congress and Exposition, XP008021719, 1995, pp. 1-8.
Zhou, Y., et al., "Adaptive Notch Filter Control for the Torsion Vibration in Lead-Screw Feed Drive System Based on Neural Network", Springer-Verlag Berlin Heidelberg, XP019121021, 2008, pp. 803-812.

(Continued)

*Primary Examiner* — Charles R Kasenge
(74) *Attorney, Agent, or Firm* — Oblon, McClelland, Maier & Neustadt, L.L.P.

(57) ABSTRACT

A method for parameterizing a digital filter for attenuation of a torsional mode of a power transmission line of an aircraft turbine engine is disclosed. The mode is associated with a frequency in a confidence interval, the digital filter is low-pass and described by a transfer function equal to the quotient N(z)/D(z), integrated into a pre-existing monitoring loop of the turbine engine, to filter signals sampled at a frequency. The method includes: calculating zeros of N(z), so that the filter attenuates the frequency; updating the zeros of N(z), so that the gain of the filter satisfies, in the interval, a first gain template; and determining the poles of D(z), so that, in the bandwidth of the loop: the phase of the filter satisfies a phase template, and the gain of the filter satisfies a second gain template.

13 Claims, 5 Drawing Sheets

(51) Int. Cl.
  *F01D 25/04* (2006.01)
  *G01H 1/10* (2006.01)
  *G05D 19/02* (2006.01)
  *H04B 3/54* (2006.01)

(52) U.S. Cl.
  CPC ............. *G05D 19/02* (2013.01); *H04B 3/542* (2013.01); *F05D 2220/323* (2013.01); *F05D 2220/329* (2013.01); *F05D 2260/96* (2013.01)

(58) Field of Classification Search
  CPC ........ F01D 21/003; G01H 1/10; G05D 19/02; H04B 3/542; F05D 2220/323; F05D 2220/329; F05D 2260/96; F05D 2260/80; Y02B 30/70; G06F 17/13
  See application file for complete search history.

(56) References Cited

OTHER PUBLICATIONS

Wang, Y., et al., "Research on predictive control of helicopter/engine based on LMS adaptive torsional vibration suppression", Journal of Low Frequency Noise, Vibration and Active Control, vol. 37, No. 4, XP055662381, 2018, pp. 1-13.

Wang, Y., et al., "A study on the Acceleration Optimization Control Method for the Integrated Helicopter/Engine System Based on Torsional Vibration Suppression", IEEE Access, vol. 7, No. 17, XP011695935, 2019, pp. 1182-1194.

Wang, Y., et al., "Adaptive Control and Predictive Control for Torsional Vibration Suppression in Helicopter/Engine System", IEEE Access, vol. 6, XP011683810, 2018, pp. 23896-23906.

Wong, T.H.; Designing and Simulating the Engine Speed Governor for Helicopter Applications; Presented at the International Gas Turbine and Aeroengine Congress and Exposition, Houston, Texas, Jun. 5-8, 1995; 8 pages.

* cited by examiner

[Fig. 1]
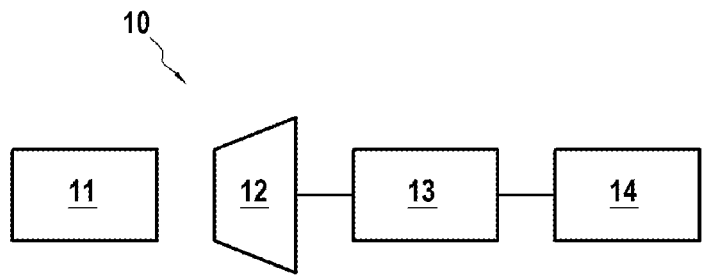
[Fig. 2]
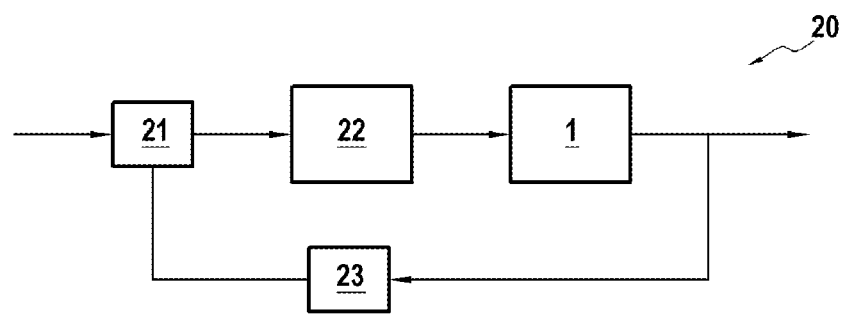
[Fig. 3]
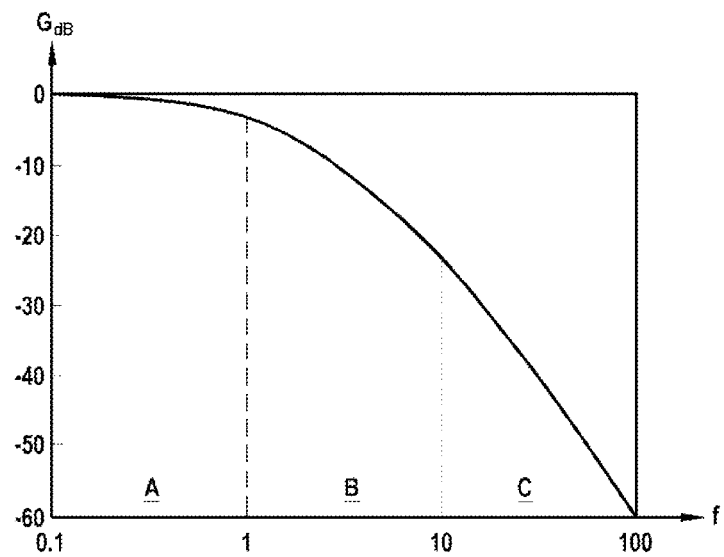

[Fig. 4]
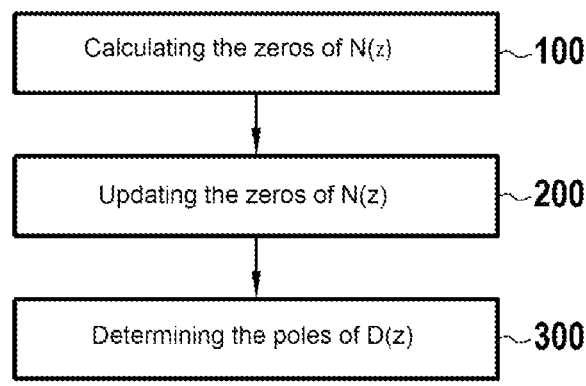
[Fig. 5]
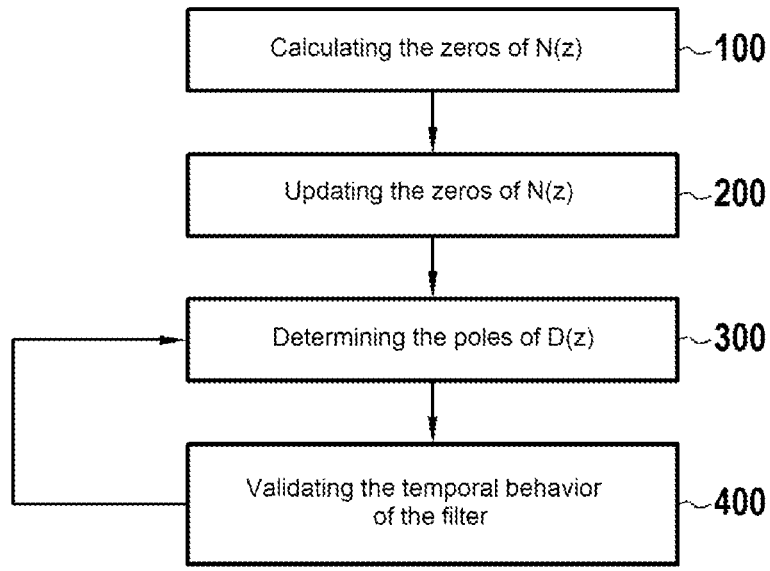

[Fig. 6A]
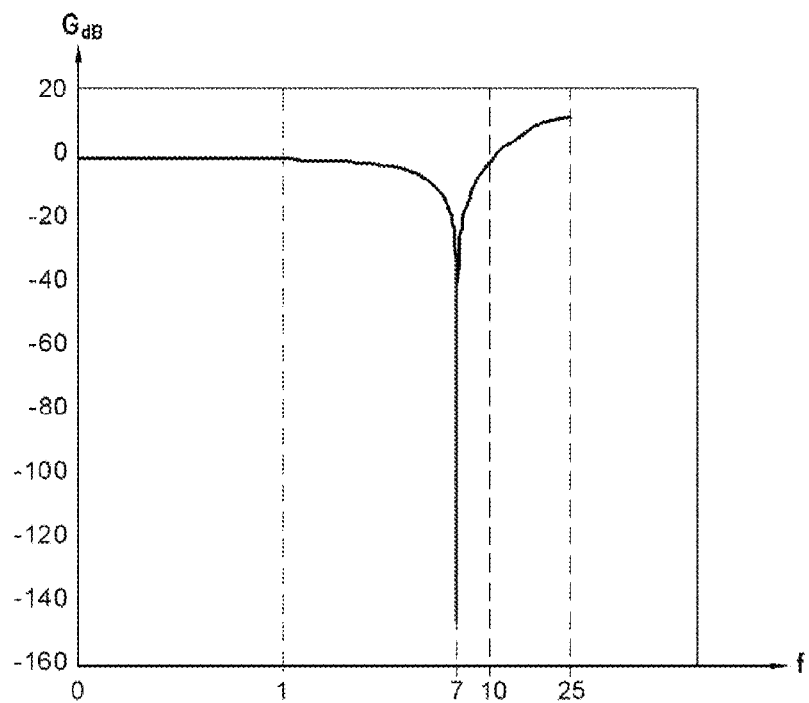
[Fig. 6B]
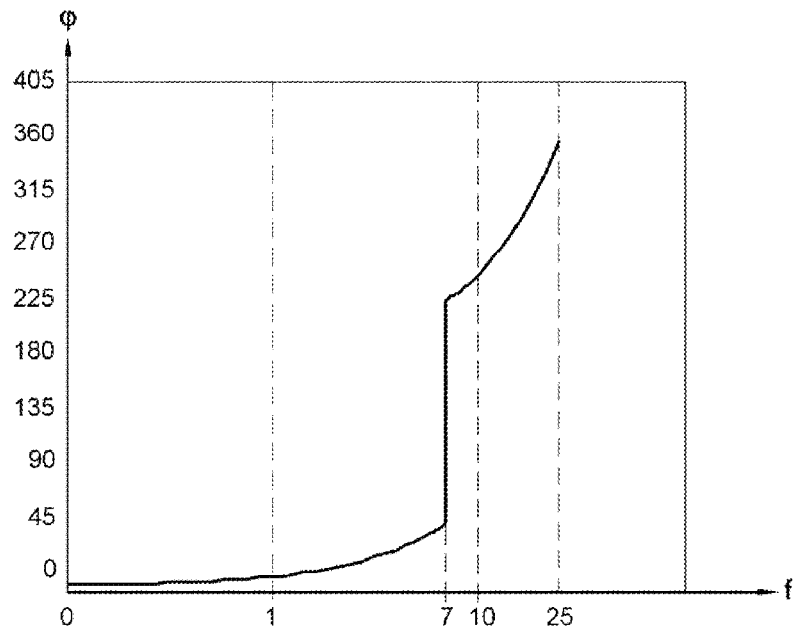

[Fig. 7A]
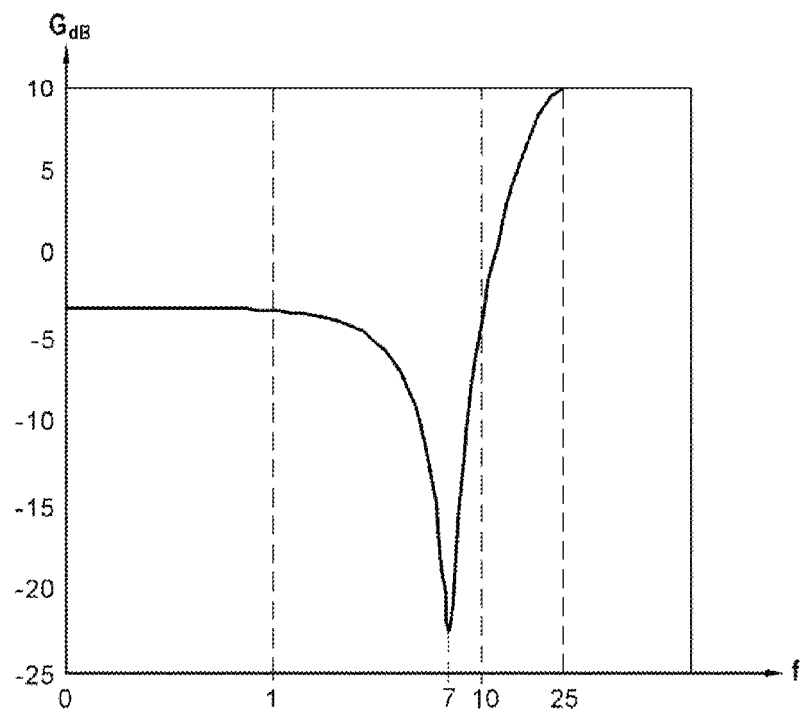
[Fig. 7B]
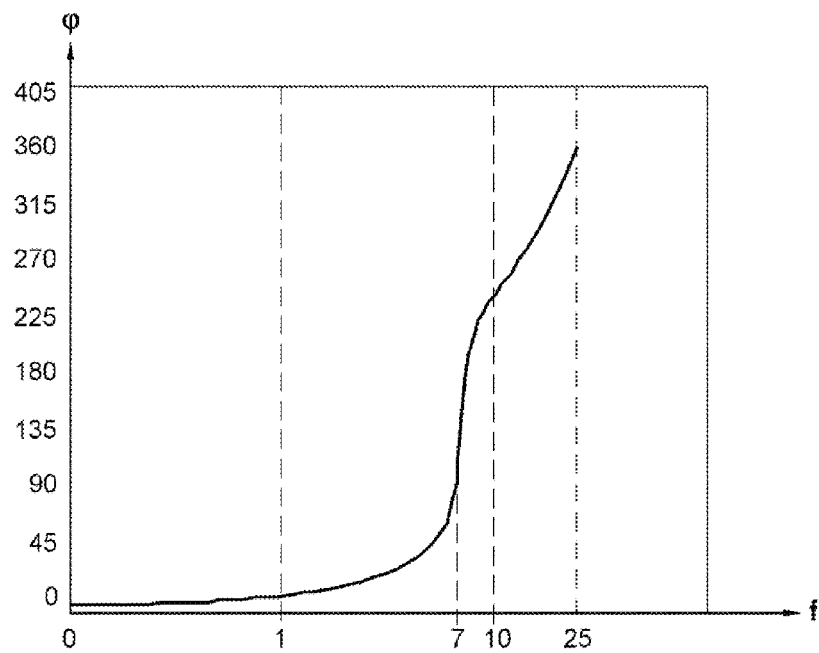

[Fig. 8A]
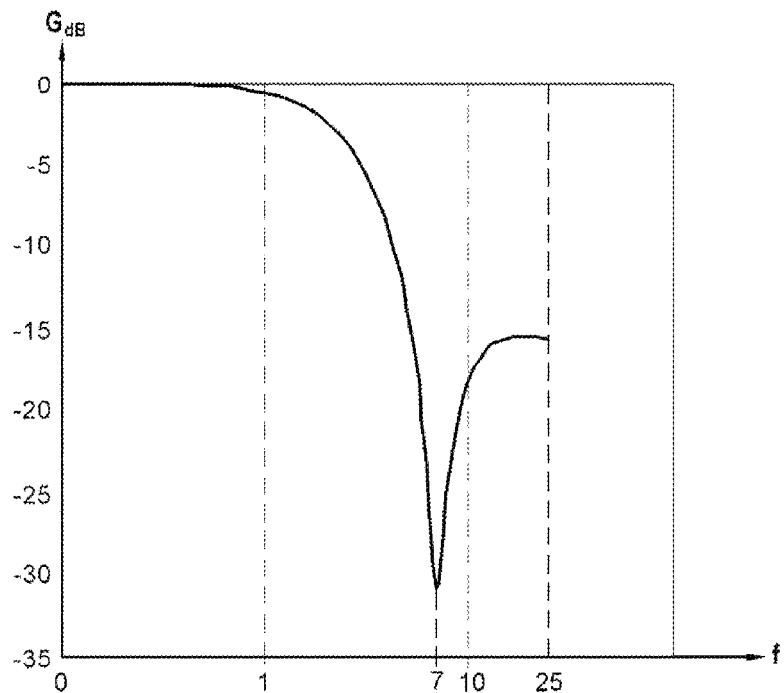
[Fig. 8B]
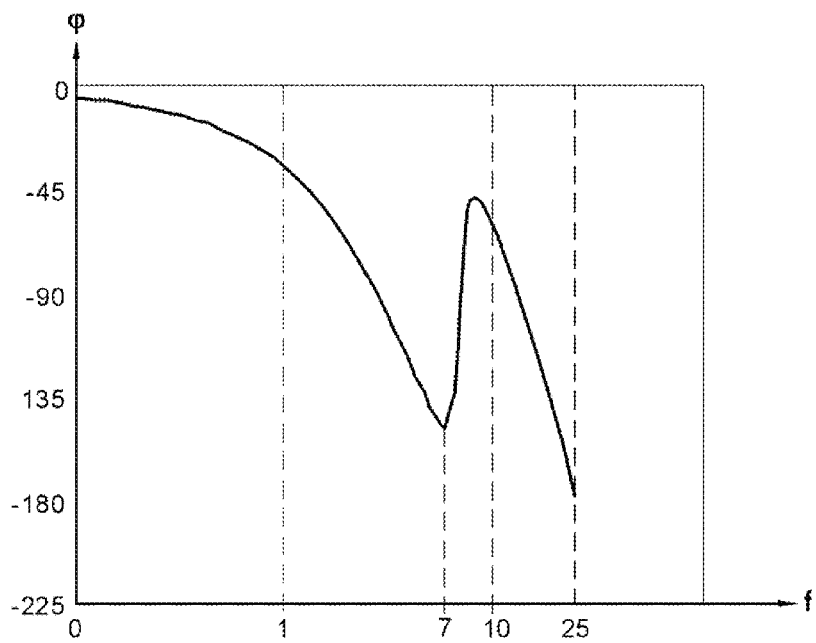

METHOD FOR CONFIGURING A DIGITAL FILTER FOR ATTENUATING A FREQUENCY ASSOCIATED WITH A TORSION MODE OF A POWER TRANSMISSION LINE OF A TURBINE ENGINE

PRIOR ART

The present invention belongs to the field of aircraft turbine engines, such as airplanes or helicopters. It relates more particularly to a method for parameterizing a digital filter model for the attenuation of a torsional mode of a power transmission line of an aircraft turbine engine. The invention finds a particularly advantageous application, although without limitation, in the case of a turbine engine comprising unducted propulsion means.

The implementation of turbine engines in the design of both civil and military aircrafts, such as airplanes and helicopters, is now widespread. The turbine engines indeed allow developing the power necessary for the aircraft flights whose mass most often reaches several tens of tons.

The turbine engines are available in different versions (gas turbines, turbojet engines, turboprops, etc.) all governed by the same operating principle, namely the conversion of a kinetic and thermal energy, derived from a gas production (typically by combustion of a hydrocarbon), into mechanical energy intended to put in rotation at least one shaft coupled to propulsion means, such as a rotor provided with propellers for example.

Conventionally, a turbine engine includes a gas generator and a turbine of the linked or free type, positioned downstream of the gas generator, with reference to the flow direction of gases in the turbine engine. This turbine is driven in rotation by the generated gas stream, so as to set in rotation a transmission line (also called "power transmission line"). The transmission line includes, in a known manner, at least one shaft directly coupled to the turbine, also called "turbine shaft", as well as at least one output shaft coupled to the propulsion means. Optionally, an epicyclic-type speed reducer connects the turbine shaft to the output shaft, in order to reduce the rotational speed of the propulsion means.

The operation of the turbine engine is conventionally piloted by a set of logics which form what is called the engine control. Among these logics, some rely on feedbacks to constitute closed-loop monitoring logics. Such a loop aims to monitor an operating parameter of the turbine engine, such as for example a rotational speed of a rotor of the propulsion means, in order to respond to a pre-established piloting strategy. To this end, the loop performs measurements of said parameter, and compares these measurements with a setpoint. The possible deviation between the measurements and the setpoint is transmitted to a control device able to generate a control signal which is transmitted to the turbine engine in order to compensate for said deviation, the monitoring process then being iterated along said loop.

The control signal generated by the control device thus impacts the operation of the turbomachine, which includes in particular the assembly formed by the turbine, the transmission line and the propulsion means. However, this assembly is in particular characterized, like any mechanical system, by a certain stiffness—here in rotation—which for sizing constraints may not be sufficient with regard to the highly inertial elements at its ends. This problem is further compounded by the increase of the length of the transmission line or by the increase of the number of its components, via the introduction of a reducer for example. The transmission line then has a torsional mode whose frequency is typically positioned outside, but nevertheless relatively close to, the bandwidth of use of the transmission line. Consequently, there is a risk that the command generated by the control device will excite the torsional mode of the transmission line, or amplify the resonance following an excitation external to the closed loop. Such a configuration is problematic insofar as the torsional oscillations can have an amplitude able to greatly degrade the fatigue strength of the transmission line, and therefore cause premature wear of the equipment and cause plasticization or rupture of the shaft.

At least conceptually, and in order to limit the excitation of the transmission line along its torsional mode, it could be envisaged, according to a first alternative, to orient the mechanical design and the sizing of the turbine engine so that said torsional mode is sufficiently far from the bandwidth of the monitoring loop. In this way, the power of the control signals would be sufficiently attenuated at the frequencies of said torsional mode.

According to a second alternative, it could be envisaged not to modify the mechanical architecture of the turbine engine, but rather to take into account the knowledge of the torsional mode (frequency, amplitude) in the design of the monitoring loop of the turbine engine. In other words, once the design of the turbine engine has been stopped, and the torsional mode has been identified, the monitoring loop is designed so that it does not excite said torsional mode.

These two alternatives nevertheless run counter to the conventional cycle of design of a turbine engine. Indeed, the sizing of a turbine engine aims to define overall production constraints, that is to say which are imposed on the turbine engine when it is considered in its entirety (or even ideally when the environment in which it is intended to be integrated is taken into account). Such constraints are related for example to the mass, the cost, the space requirement, the modes of operation and use, etc. Nevertheless, a turbine engine is a complex architectural system, in the sense that it is manufactured by means of a large quantity of parts, so that it is at the same time difficult to list all these high-level constraints at each of said different parts and to anticipate, before producing them, the behavior of the final machine.

Consequently, the complex dynamic behaviors related to integration effects are often discovered late in the design cycle and validated only during engine tests, once all of said parts have been produced and assembled.

It is therefore understood that if the initial sizing does not allow avoiding a torsional mode of the line, the mechanical design and/or the regulation logic associated with the monitoring loop must be reviewed, which is particularly long and expensive, and consequently to be avoided.

DISCLOSURE OF THE INVENTION

The purpose of the present invention is to overcome all or part of the drawbacks of the prior art, in particular those set out above, by proposing a solution which allows attenuating a torsional mode of a power transmission line of a turbine engine, so as to avoid any material resizing of said turbine engine as well as any alteration of the pre-existing operating regulation logic of said turbine engine.

To this end, and according to a first aspect, the invention relates to a method for parameterizing a digital filter for the attenuation of a torsional mode of a power transmission line of an aircraft turbine engine, said mode being associated with a frequency F_T comprised in a confidence interval Ic, the digital filter being of the low-pass type and:
- described by a z transfer function which is causal, stable and equal to the quotient N(z)/D(z), where N and D are polynomial functions, N being of degree strictly greater than 1,
- intended to be integrated into a pre-existing monitoring loop of the turbine engine, so as to filter control signals generated by a control device of said loop and sampled at a frequency F_E, said loop being closed and associated with a bandwidth in which the gain of the loop is increased, in absolute value, by a value V.

In addition, said method is implemented by a parameterization device and includes:
- a step of calculating, as a function of the frequencies F_T and F_E, complex numbers forming zeros of N(z), so that the filter attenuates the frequency F_T,
- a step of updating the zeros of N(z), so that the gain of the filter satisfies, in the confidence interval Ic, a first predetermined gain template as a function of the amplitude of the torsional mode,
- a step of determining real numbers forming poles of D(z), so that, in the bandwidth of the loop:
    - the phase of the filter satisfies a predetermined phase template as a function of the frequency F_E,
    - the gain of the filter satisfies a second predetermined gain template as a function of the value V.

The step of calculating the zeroes of N(z) allows initiating the parameterization of the filter by accurately targeting the frequency F_T to be attenuated. At this stage, the frequency behavior of the filter phase is not taken into account.

Following the calculation step, the update step allows releasing the attenuation hitherto targeted only at the frequency F_T, so as to take into account the confidence interval Ic in which said frequency F_T is comprised. In other words, this step allows taking into account the uncertainty associated with the value of the frequency F_T, and therefore making the final attenuation sought for the digital filter more robust relative to this uncertainty.

It should be noted that at this stage, again, the frequency behavior of the filter phase is not taken into account. On the other hand, the behavior of the filter gain is for its part substantially stopped, and is likely to vary only marginally during the subsequent step of determining the poles of D(z). More specifically, the fact that the module of the gain decreases, in absolute value and in the interval Ic during the update step, is thwarted by the fact that it increases again during the step of determining the poles of D(z).

Finally, the step of determining the poles of D(z) aims to place the poles of D(z) so as to monitor the evolution of the phase of the filter on the bandwidth of the loop, which ultimately allows monitoring the phase of the filter over the entire frequency spectrum envisaged (areas A, B and C). In addition, the fact of also constraining the gain of the filter in the bandwidth of the loop allows ensuring that the useful information contained in the control signals can continue to be routed to the actuators of the turbine engine.

Thus, the invention allows integrating at the output of the control device of the closed loop a digital filter configured to attenuate the torsional mode associated with the power line, without physically resizing the turbine engine, as well as without modifying the pre-existing regulation logic (that is to say the operation of a monitoring system operating according to said pre-existing closed loop). The digital filter obtained by the parameterization method only complements the pre-existing regulation logic.

It should be noted that the parameterization of the digital filter is advantageously performed by decoupling the placement of the zeros of the numerator N(z), to ensure sufficient attenuation in the interval Ic, from the placement of the poles of the denominator D(z), to essentially monitor the phase of the digital filter.

Such a decoupling is advantageous because it allows obtaining a discrete linear filter, but also a good compromise between the intended behavior of the filter and a low filter degree. The filter obtained in this way is also very easily implementable in computer software from libraries of elementary functions known to those skilled in the art and commonly used for the production of certified aeronautical software.

In particular modes of implementation, the parameterization method may further include one or several of the following characteristics, taken in isolation or in any technically possible combination.

In particular modes of implementation, the step of updating the zeros of N(z) includes a sub-step of reducing the respective modules of the zeros at a predetermined pitch, the reduction sub-step being executed iteratively as long as the first amplitude template is not satisfied.

Thus reducing the respective modules of the zeros determined during the calculation step allows moving them away from the unit circle, and thus widening the filter attenuation area so as to take into account the confidence interval Ic. This further allows obtaining a good compromise between the efficiency and the complexity of the parameterization.

In particular modes of implementation, the poles of D(z) are all considered equal to each other, the pole determination step including:
- a sub-step of selecting a pole comprised strictly between −1 and 1,
- a sub-step of translating the selected pole along the real axis and at a predetermined pitch, so as to obtain a translated pole, said translation sub-step being executed iteratively as long as the phase template and the second gain template are not satisfied, the pole selected during an iteration corresponding to the translated pole obtained during the previous iteration.

Thus determining the poles of D(z) advantageously allows monitoring the evolution of the phase of the filter on the bandwidth of the loop, which ultimately allows monitoring the phase of the filter over the entire frequency spectrum. In addition, the fact of also constraining the gain of the filter and thus normalizing it in the bandwidth of the loop ensures that the useful information contained in the control signals can continue to be routed to actuators of the turbine engine.

In particular modes of implementation, the first gain template corresponds to an increase, in the confidence interval Ic, of the value of the gain by the opposite of the amplitude of the torsional mode.

In particular modes of implementation, the phase template corresponds to an increase in the phase shift introduced by the filter in the bandwidth of the closed loop.

In particular modes of implementation, the degree of N(z) is equal to 2, so as to obtain, during the calculation step, zeros z_1 and z_2 according to the following formulation:

$$z\_1 = \exp((2 \times i \times \pi \times F\_T)/F\_E) \text{ and } z\_2 = \exp((-2 \times i \times \pi \times F\_T)/F\_E).$$

The fact that N(z) is of degree equal to 2 allows limiting the complexity of the filter, as well as specifically targeting the frequency F_T to be attenuated.

In particular modes of implementation, the degree of $D(z)$ is equal to 3.

The fact that $D(z)$ is of degree equal to 3 advantageously allows limiting the complexity of the filter, while allowing to have a strictly clean filter.

In particular modes of implementation, the frequency F_T and the confidence interval Ic are determined beforehand during a series of tests on a test bench of the oscillatory behavior of the power transmission line.

In particular modes of implementation, said method includes, following the step of determining real numbers forming poles of $D(z)$, a step of validating the temporal behavior of the digital filter, said validation step consisting in verifying that the temporal response of the filter to a step signal is monotonously increasing.

According to a second aspect, the invention relates to a monitoring system intended to be on board an aircraft including a turbine engine, said turbine engine comprising a power transmission line having a torsional mode associated with a frequency F_T comprised in a confidence interval Ic, said system including means for receiving a setpoint relating to a predetermined parameter, a control device configured to generate control signals sampled at a frequency F_E and means for measuring said parameter, said monitoring system forming a closed monitoring loop associated with a bandwidth in which the gain is increased, in absolute value, by a value V. In addition, the monitoring loop includes a digital filter parameterized by means of a method according to the invention, said digital filter being integrated into said loop so as to filter the control signals.

According to a third aspect, the invention relates to a computer program including a set of program code instructions which, when they are executed by a processor, configure said processor to implement a parameterization method according to the invention.

According to a fourth aspect, the invention relates to a recording medium readable by a computer on which a computer program according to the invention is recorded.

According to a fifth aspect, the invention relates to a device for parameterizing a digital filter, said filter being intended to attenuate a torsional mode of a power transmission line of an aircraft turbine engine, said mode being associated with a frequency F_T comprised in a confidence interval Ic, the digital filter being of the low-pass type and:
- described by a z transfer function which is causal, stable and equal to the quotient $N(z)/D(z)$, where N and D are polynomial functions, N being of degree strictly greater than 1,
- intended to be integrated into a pre-existing monitoring loop of the turbine engine, so as to filter control signals generated by a control device of said loop and sampled at a frequency F_E, said loop being closed and associated with a bandwidth in which the gain of the loop is increased, in absolute value, by a value V, said device including:
- a calculation module, configured to calculate, as a function of the frequencies F_T and F_E, complex numbers forming zeros of $N(z)$, so that the filter attenuates the frequency F_T,
- an update module, configured to update the zeros of $N(z)$, so that the gain of the filter satisfies, in the confidence interval Ic, a first predetermined gain template as a function of the amplitude of the torsional mode,
- a determination module, configured to determine real numbers forming poles of $D(z)$, so that, in the bandwidth of the loop:

the phase of the filter satisfies a predetermined phase template as a function of the frequency F_E,
  the gain of the filter satisfies a second predetermined gain template as a function of the value V.

According to a sixth aspect, the invention relates to an aircraft including a turbine engine, said turbine engine comprising a power transmission line having a torsional mode associated with a frequency F_T comprised in a confidence interval Ic. In addition, said aircraft includes a monitoring system according to the invention.

BRIEF DESCRIPTION OF THE DRAWINGS

Other characteristics and advantages of the present invention will emerge from the description given below, with reference to the appended drawings which illustrate an exemplary embodiment thereof without limitation. In the figures:

FIG. 1 schematically represents an exemplary embodiment of a system, called power transmission system, of an aircraft turbine engine;

FIG. 2 schematically represents an example, known to those skilled in the art, of operation, in nominal mode, of a monitoring system of a turbine engine;

FIG. 3 schematically represents the gain of the transfer function associated with the closed monitoring loop according to which the monitoring system of FIG. 2 is configured;

FIG. 4 represents a flowchart of a mode of implementation of a method for parameterizing a digital filter according to the invention, said method making it possible to attenuate a torsional mode of a power line of a turbine engine;

FIG. 5 schematically represents a preferred mode of implementation, according to the invention, of the parameterization method of FIG. 4, in which said method includes a step of validating the temporal behavior of the digital filter;

FIG. 6A represents the evolution of the gain of the obtained digital filter, during the parameterization method according to the invention, after a step of calculating the zeros of said filter;

FIG. 6B represents the evolution of the phase of the obtained digital filter, during the parameterization method according to the invention, after a step of calculating the zeros of said filter;

FIG. 7A represents the evolution of the gain of the obtained digital filter, during the parameterization method according to the invention, after a step of updating the zeros of said filter;

FIG. 7B represents the evolution of the phase of the obtained digital filter, during the parameterization method according to the invention, after a step of updating the zeros of said filter;

FIG. 8A represents the evolution of the gain of the obtained digital filter, during the parameterization method according to the invention, after a step of determining the poles of said filter;

FIG. 8B represents the evolution of the phase of the obtained digital filter, during the parameterization method according to the invention, after a step of determining the poles of said filter.

DESCRIPTION OF THE EMBODIMENTS

The present invention is situated in the field of turbine engines for aircrafts, and more particularly in the field of the damping of one or several mechanical elements forming part of a turbine engine.

"Damping" refers here to the control of the amplitude of oscillations insofar as these are likely to be associated with a frequency equal or at least close to the frequency of an eigenmode characteristic of the assembly formed by said mechanical elements, this mode being likely to lead to premature wear of said assembly when it is maintained over time or when it is repeatedly excited. In other words, the damping notion corresponds to the fact of seeking a damping of oscillations evolving at a predetermined frequency and likely to damage the considered mechanical elements.

FIG. 1 schematically represents an exemplary embodiment of a system 10, called power transmission system, of an aircraft turbine engine 1.

In practice, the power transmission system 10 may also include other elements than those represented in FIG. 1, but which nevertheless depart from the scope of the present invention.

As illustrated in FIG. 1 without limitation, the power transmission system 10 includes a gas generator 11. This generator 11 typically corresponds to a combustion chamber in which hydrocarbons are ignited to generate gases at high temperature as well as at high speed. The gases generated are then routed to a turbine called power turbine 12, which is thus set in motion. Such a power turbine 12 may be designated by the expression "free turbine" by those skilled in the art in some engine architectures.

A turbine shaft is coupled, at its respective ends, to the power turbine 12, as well as to an epicyclic-type speed reducer 13. Another shaft, called output shaft, and opposite to the turbine shaft relative to the speed reducer 13, extends for its part between the speed reducer 13 and propulsion means 14 of the aircraft.

The turbine shaft is therefore rotated by the power turbine 12. The speed reducer 13 for its part allows rotating the output shaft at a reduced speed compared to that of the turbine shaft. Finally, the propulsion means 14 are in turn driven by the output shaft.

The assembly formed by the turbine and output shafts, as well as by the speed reducer 13, is commonly called "power transmission line". It is indeed understood that this assembly is responsible for ensuring the transmission of the rotational energy from the power turbine 12 to the propulsion means 14.

The remainder of the description relates more specifically, but without limitation, to a turbine engine 1 of the turboprop type for an airplane. It is therefore a turbine engine 1 whose main thrust is obtained by the rotation of at least one propeller including a plurality of blades. For example, and preferably, the propulsion means 14 include two unducted contra-rotating propellers, which allows in particular improving the propulsive efficiency.

However, following other examples not detailed here, nothing excludes considering other types of turbine engines, such as for example a turbojet engine. The invention is indeed applicable to any type of turbine engine whose operation is desired to be monitored such that the transmission line is not excited according to a torsional mode specific thereto. Also nothing excludes considering another type of turbine downstream of the gas generator, such as for example a linked turbine of a type known per se, as well as an aircraft of another type, such as for example a helicopter.

It is noted that the torsional mode of the transmission line results not only from its torsional flexibility, this flexibility being a function of the materials used in its manufacture as well as of its length and of its diameter, but also due to the fact that it is rotated between the power turbine 12 and propulsion means 14 which, for their part, are elements having an inertia much greater than that of the transmission line (as well as of the speed reducer 13 in this example). In other words, during nominal operation of the turbine engine 1, the transmission line is likely to be subjected to a torsional torque able to excite its torsional mode according to an eigen frequency $F\_T$ associated with this mode.

The operation of the turbine engine 1 is conventionally piloted by a monitoring system 20 on board the aircraft.

FIG. 2 diagrammatically represents an example, known to those skilled in the art, of operation, in nominal mode, of the monitoring system 20 of the turbine engine 1. Such a figure is also designated by the expression "servo-control block diagram".

"Nominal mode" refers here to the mode according to which the monitoring system 20 acts on the turbine engine 1 when the latter is subjected to constraints which may affect its operation, but which have nevertheless been taken into account in the design of the turbine engine 1 before dynamic response tests of the transmission line are carried out.

Conventionally, and as represented in FIG. 2, the monitoring system 20 includes as input means for receiving 21 a setpoint of type known per se, such as for example a computer. According to the present exemplary embodiment, the setpoint is representative of a desired rotational speed of a rotor of the propulsion means. It should however be noted that other physical parameters can be considered to define the setpoint, such as for example a predetermined orientation of the aircraft. The choice of a parameter depends in particular on the monitoring strategy which is chosen to ensure the thrust of the aircraft.

Such a monitoring system 20 includes a control device 22 configured to generate control signals intended to be transmitted to actuators (not represented in FIG. 2) of the aircraft. Such actuators are for example means configured to deliver a determined amount of hydrocarbons to the gas generator 11, such as for example a fuel metering valve.

The control device 22 includes for example one or several processors and storage means (magnetic hard disk, electronic memory, optical disc, etc.) in which data and a computer program are stored, in the form a set of program code instructions to be executed in order to implement all or part of the piloting of the operation of the turbine engine 1. Alternatively or additionally, the control device 22 also includes one or several programmable logic circuits of the FPGA, PLD type, etc., and/or specialized integrated circuits (ASIC), and/or a set of discrete electronic components, etc. adapted to implement the piloting of the operation of the turbine engine 1.

In other words, the control device 22 includes a set of means configured in software (specific computer program) and/or hardware (FPGA, PLD, ASIC, etc.) way to implement the piloting of the operation of the turbine engine 1.

In a particular exemplary embodiment, the control device 22 is configured according to a "PID" (Proportional, Integral, Derivative) type model that those skilled in the art know how to implement. Such an exemplary embodiment nevertheless constitutes only one alternative embodiment, and nothing excludes having a control device configured according to a model of a different type not detailed here.

The monitoring system 20 also includes, at the output, a measurement of the rotational speed of the rotor of the propulsion means 14, typically thanks to dedicated sensors 23, such as for example phonic wheels. This measured speed is redirected to the input of the monitoring system 20 so that the latter operates according to a closed-loop monitoring logic.

The control device 22 is an integral part of the closed monitoring loop, and is therefore configured to generate a control signal based on a deviation between the speed setpoint and the speed measurement. The speed setpoint is therefore servo-controlled, and the control device acts as a corrector to compensate for said deviation. The control signal is then transmitted to the actuators, which has an effect on the turbine engine 1, and therefore ultimately also on the transmission line (change in the rotational speed of the turbine and output shafts, and therefore of the propulsion means 14).

It should be noted that a control signal generated in response to a setpoint deviation corresponds to a digital signal. The sampling frequency of the control signals generated during the operation of the turbine engine 1 is denoted F_E in the remainder of the description, and is for example equal to 50 Hz. Nothing excludes however, according to other examples not detailed here, to consider a sampling frequency F_E other than 50 Hz.

The monitoring loop as known so far, and illustrated in FIG. 2, is associated with a transfer function representative of the frequency response, to a control signal, of the assembly formed by the actuators and the turbine engine 1. Insofar as this assembly corresponds to a physical assembly of the real world, the transfer function here is of the low-pass type.

It will be clear to those skilled in the art that the expressions "gain of the monitoring loop" and "gain of the transfer function associated with the monitoring loop" have the same meaning in the following description.

FIG. 3 schematically represents the gain of the transfer function associated with the closed monitoring loop, and corresponds to a graph on a semi-logarithmic scale (Bode diagram). This graph has an abscissa axis representing the frequency f in Hertz (Hz), as well as an ordinate axis representing the gain of the filter GdB in decibels (dB).

As illustrated in FIG. 3, the evolution of the gain as a function of frequency includes three areas, namely:
- an area A corresponding to the bandwidth of the transfer function (in this example, it extends between 0 Hz and substantially 1 Hz), and in which the gain of the loop is increased, in absolute value, by a value V, for example equal to 0 dB,
- an area C corresponding to the attenuated band of the transfer function (in this example, it extends beyond substantially 10 Hz),
- an area B corresponding to the transition band of the transfer function, and located between the areas A and C.

The frequency F_T of the torsional mode is located in the area B. Also, the frequency F_T is sufficiently close to the area A for it to be necessary to envisage attenuating it, in order to avoid the excitation of the associated torsional mode, and therefore to eliminate any risk of premature equipment wear. The present invention proposes a solution to this problem, a solution which does not require modifying the mechanical architecture of the turbine engine or modifying the pre-existing regulation logic of the operation of the turbine engine.

For example, the frequency F_T is equal to 7 Hz and associated with a confidence interval Ic whose respective bounds are 6.5 Hz and 7.5 Hz. Nothing excludes, according to other examples not detailed here, to consider other values for the frequency F_T as well as for the confidence interval Ic.

It should be noted that the frequency F_T is associated with a confidence interval Ic. The existence of such a confidence interval Ic is justified by the fact that the frequency F_T cannot be known with an absolute accuracy, insofar as dispersions can exist from one engine to another during a mass production.

Thus, according to one preferred example, the frequency F_T is determined during a series of tests on a test bench of the dynamic behavior of the power transmission line. It should be noted that such a series of tests is conducted once the mechanical sizing of the turbine engine as well as the design of the regulation logic have been completed. The confidence interval Ic therefore depends on the accuracy of the measurements performed during the tests, but also on the number of tests performed according to statistical methods known to those skilled in the art, and not detailed here because it is departing from the scope of the invention.

However, nothing excludes considering other methods for obtaining the frequency F_T as well as its confidence interval Ic. For example, they can be obtained by digital simulation, which therefore requires fine modeling of the different mechanical portions forming the turbine engine as well as a mathematical simulation model representative of the dynamic behavior of these portions.

Nothing excludes either, for the choice of Ic, taking into account any other parameter which would be identified as a source of variation of the frequency F_T, such as for example the dispersions related to the methods for manufacturing the parts which constitute the power transmission line or the evolution of these parameters during the life of said parts.

FIG. 4 represents a flowchart of one mode of implementation of a method for parameterizing a digital filter for the attenuation of the torsional mode associated with the frequency F_T.

Said parameterization method is implemented by a parameterization device (not represented in the figures) which includes for example one or several processors and storage means (magnetic hard disk, electronic memory, optical disk, etc.) in which data and a computer program are stored, in the form of a set of program code instructions to be executed in order to implement all or part of the steps of the parameterization method. Alternatively or additionally, the parameterization device also includes one or several programmable logic circuits, of FPGA, PLD, etc. type, and/or specialized integrated circuits (ASIC), and/or a set of discrete electronic components, etc. adapted to implement all or part of the steps of the parameterization method.

In other words, the parameterization device includes a set of means configured in software (specific computer program) and/or hardware (FPGA, PLD, ASIC, etc.) way to implement the various steps of the parameterization method.

The digital filter parameterized by means of the parameterization method is intended to be integrated into the pre-existing monitoring loop so as to filter the control signals generated by the control device 22. In other words, the digital filter is intended to be integrated, for example in software way, at the output of the control device 22.

The digital filter of the present invention is sought in the form of a low-pass filter, in particular so as not to disturb the behavior of the transfer function associated with the monitoring loop.

The digital filter is further sought so that the transfer function associated thereto is causal, stable and equal to the quotient $N(z)/D(z)$, where N and D are polynomial functions, N being of degree strictly greater than 1. The transfer function is therefore a rational fraction. As it is causal, this implies that the degree of the denominator is strictly greater than that of the numerator. The stability criterion implies for its part that the poles of $D(z)$ are all comprised in the unit circle of the complex plane. It will also be clear to those skilled in the art that the argument z of the functions N(z) and D(z) corresponds to the notation of a complex variable conventionally used for the manipulation of the discrete signals whose link with the continuous representation is made through the z transform. We then have the following formula:

$$z = \exp(2i\pi \times p/F\_E)$$

where p is the Laplace variable.

The roots of the numerator N(z) and of the denominator D(z) are called respectively zeros and poles.

The parameterization method includes several steps. In its general principle, the method first consists of placing the zeros of the numerator in order to target the attenuation of the frequency F_T. These zeros are then updated so as to take into account the uncertainty of the value of the frequency F_T. It is only after the parameterization of the numerator is completed that the denominator is in turn parameterized by placement of its poles, essentially in order to adjust the phase of the digital filter.

The parameterization method firstly includes a step 100 of calculating, as a function of the frequencies F_T and F_E, complex numbers forming zeros of N(z), so that the filter attenuates the frequency F_T.

The purpose of step 100 is to target a first placement of the zeros of N(z) in order to ensure an attenuation of the frequency F_T.

In one preferred mode of implementation, the degree of N(z) is equal to 2. This implies that N(z) includes two zeros respectively denoted z_1 and z_2. These zeros z_1 and z_2 are calculated according to the following formulation during the calculation step 100:

$$z\_1 = \exp((2 \times i \times \pi \times F\_T)/F\_E) \text{ and } z\_2 = \exp((-2 \times i \times \pi \times F\_T)/F\_E).$$

Calculating the zeros z_1 and z_2 in this way amounts to determining a digital filter specifically targeting the frequency F_T as being the frequency to be attenuated. The fact that such zeros are firstly determined on the unit circle is representative of the poor damping of the frequency F_T by the power transmission line.

However, nothing excludes calculating, during step 100, zeros z_1 and z_2 in a different way, since they allow excluding a frequency area substantially centered around the frequency F_T associated with the torsional mode. Preferably, the zeros are determined during step 100 close to the unit circle (therefore of module substantially equal to 1), ideally on the unit circle, in order to initiate the parameterization method in a simple manner.

The fact of choosing a degree of N(z) equal to 2 allows limiting the complexity of the filter. It should however be noted that this choice constitutes only one alternative implementation of the invention. For example, N can be parameterized so as to be of degree strictly greater than 2, for example equal to 4, as long as the constraint according to which the filter is causal is satisfied.

The parameterization method then includes a step 200 of updating the zeros of N(z), so that the gain of the filter satisfies, in the confidence interval Ic, a first amplitude template predetermined as a function of the amplitude of the torsional mode.

This step 200 of updating the zeros allows taking into account the uncertainty associated with the value of the frequency F_T, and therefore making the final attenuation sought for the digital filter more robust relative to this uncertainty.

In a particular mode of implementation, the step 200 of updating the zeros of N(z) includes a sub-step of reducing the respective modules of the zeros at a predetermined pitch. The fact of reducing the respective modules of the zeros determined during the calculation step 100 allows moving said zeros away from the unit circle (inwardly of the unit circle), and therefore thus widening the attenuation area of the filter so as to take into account the confidence interval Ic.

The module reduction sub-step is then iterated as long as the first gain template is not satisfied.

For example, the module reduction pitch is set equal to 0.01. In this way, and during a first iteration of the decrease sub-step, the updated zeros have a module equal to 0.99. It is further understood that if the reduction sub-step is iterated for example five times, the zeros obtained at the end of the update step 200 will have a module equal to 0.95.

However, following other examples not detailed here, nothing excludes considering a pitch greater or less than 0.01. Nothing either excludes considering a reduction in the modules which is not of the additive type, but for example of the multiplicative type.

The fact of gradually reducing the modules iteratively allows obtaining a good compromise between the calculation time and the complexity of the parameterization.

However, it should be noted that this way of proceeding constitutes only one alternative implementation of the invention. For example, the updating of the zeros of step 100 can be carried out by means of an optimization algorithm, for example a shape optimization algorithm, aiming to optimize a predetermined cost function as a function of the amplitude of the torsional mode. Such an optimization algorithm nevertheless increases the complexity of step 200 of updating the zeros of N(z).

By way of non-limiting example, the first gain template corresponds, in the confidence interval Ic, to a preferably strict increase of the value of the gain by the opposite of the amplitude of the resonance of the torsional mode. For example, if the torsional mode results in a 3 dB peak on the Bode diagram of the system at the frequency F_T, the filter is designed so that the gain compensates, to the minimum, for this amplification. In terms of template, this results in a maximum constraint of −3 dB at the frequency F_T.

Indeed, the update of the zeros according to the invention reduces, in absolute value, the amplitude of the filter gain compared to the gain obtained at the end of the single calculation step 100. Consequently, setting such a first gain template allows providing a constraint to stop the update of the zeros, so that the filter will completely attenuate the frequency F_T in the confidence interval Ic.

The choice of such a first gain template constitutes only one alternative implementation of the invention. Other alternatives can therefore be envisaged, such as for example having a first gain template corresponding to a gain value, in the interval Ic, greater than or equal to the opposite of the amplitude of the torsional mode. For example, the first gain template can correspond to a gain value between 90% and 95% of the amplitude of the torsional mode. Indeed, the step subsequent to the zero update step 200, and which is described later, has the effect of further reducing the gain of the digital filter at the frequency F_T, so that it is possible to achieve a compromise between the amplitude of the torsional mode, the gain of the filter at the end of step 200 and the length of the interval Ic.

It is therefore understood that steps 100 and 200 aim essentially to parameterize the digital filter in order to calibrate its gain around the frequency F_T, the calibration of the phase and of the gain on the rest of the frequency spectrum, and in particular on the bandwidth of the closed loop, being carried out later.

To this end, the parameterization method includes a step 300 of determining real numbers forming poles of D(z). The fact of finding the poles of D(z) in the form of real numbers allows guaranteeing the damped behavior of the filter.

Said step 300 is carried out under constraints, namely that the poles of D(z) are determined so that, in the bandwidth of the loop:

the phase of the filter satisfies a predetermined phase template as a function of the frequency F_E, the gain of the filter satisfies a second predetermined gain template as a function of the value V.

This step 300 therefore aims to place the poles of D(z) so as to monitor the evolution of the phase of the filter on the bandwidth of the monitoring loop, which ultimately allows monitoring the phase of the filter over the entire frequency spectrum envisaged (areas A, B and C). In addition, the fact of also constraining the gain of the filter in this way in the bandwidth of the loop ensures that the useful information contained in the control signals can continue to be routed to the actuators of the turbine engine 1 without attenuation.

In one preferred mode of implementation, the poles of D(z) are all considered equal. Considering the poles all equal to each other allows obtaining an advantageous compromise between the complexity of the parameterization (and therefore the calculation time and the necessary calculation means) and the accuracy of the behavior of the filter. It should nevertheless be noted that the choice of poles which are all equal to each other constitutes only one alternative implementation of the invention. For example, the real poles can be determined so as to be all distinct from each other, or so that only some poles are equal to each other.

In one particular mode of implementation, step 300 of determining the poles of D(z) includes:

a sub-step of selecting a pole comprised strictly between −1 and 1, a sub-step of translating the selected pole along the real axis and at a predetermined pitch, so as to obtain a translated pole.

The translation sub-step is then iterated as long as the phase template and the second gain template are not satisfied. In order to carry out such iteration, the pole selected during an iteration corresponds to the translated pole obtained during the previous iteration.

For example, said translation pitch along the real axis is set equal to 0.01 in the direction of the decreasing reals. In this way, and during a first iteration of the translation sub-step, the pole is equal to 0.89 if the pole initially selected is equal to 0.9. It is further understood that if the translation sub-step is iterated for example five times, the pole obtained at the end of step 300 will be equal to 0.85 if the very first pole selected is equal to 0.9.

However, following other examples not detailed here, nothing excludes considering a pitch greater than or less than 0.01, as well as a translation in the direction of increasing reals. Typically, the direction of translation depends on the position of the pole initially selected relative to the bounds −1 and 1. Nothing excludes either having a direction of translation along the real axis which changes between at least two iterations, for example in the case where the direction of translation is determined by means of an optimization algorithm aiming to optimize a predetermined cost function as a function of the frequency F_E and of the value V.

The fact of determining the pole of D(z) by iteration of translations allows obtaining a good compromise between the computation time and the complexity of the parameterization.

However, it should be noted that this way of proceeding constitutes only one alternative implementation of the invention. Thus, according to considerations similar to those described above in the case of step 200, the determination of the pole of D(z) can be carried out by means of an optimization algorithm, for example a shape optimization algorithm. However, such an optimization algorithm increases the complexity of step 300.

By way of non-limiting example, the phase template corresponds to an increase in the phase shift introduced by the filter on the area A, which corresponds to the bandwidth of the closed loop. For example, this increase corresponds to a predetermined multiple of the product of the period 1/F_E by the maximum pulse delimiting the area A.

The fact of increasing the phase shift in the bandwidth of the loop allows avoiding an excessive distortion of the phase during the monitoring of the operation of the turbine engine 1. In other words, proceeding in this way advantageously does not destabilize the existing monitoring loop, by limiting the introduced phase shift effects, it being understood that any digital processing necessarily generates effects on the phase.

In addition, the fact of normalizing the gain of the filter does not affect the gain of the closed loop at low frequency.

In one preferred mode of implementation, the numerator D(z) is parameterized so as to be of degree equal to 3. This choice advantageously allows meeting the need while limiting the complexity of the filter. It should however be noted that this choice constitutes only one alternative implementation of the invention. For example, D(z) can be parameterized so as to be of degree strictly greater than 3, for example equal to 5, as long as the constraint according to which the filter is causal is satisfied.

FIG. 5 schematically represents one preferred mode of implementation of the parameterization method, in which said method includes, following step 300 of determining real numbers forming poles of D(z), a step 400 of validating the temporal behavior of the digital filter. By "validation of the temporal behavior", reference here is made to verify that the output of the digital filter follows an expected behavior over time in response to a known input signal.

In other words, the validation step 400 allows ensuring that the digital parameterized filter according to the invention does not have unsuitable behavior.

In said preferred mode of implementation, said validation step 400 consists in verifying that the temporal response of the filter to a step signal (Heaviside function) is monotonously increasing. Such a verification step corresponds to the study of the unit-step response of the digital filter. It is therefore not detailed here further. It is only specified that the temporal behavior of the filter is effectively validated when said temporal response is monotonously increasing.

Once the validation step 400 is completed, and when the temporal behavior of the parameterized filter is ultimately not satisfactory, the pole D(z) determination step 300 and the validation step 400 are iterated as long as the behavior of the digital filter is not validated. In other words, the poles of D(z) are readjusted. To readjust the poles of D(z), step 300 can for example be executed by choosing real poles all identical, but for which the first pole selected before any translation differs from the one selected during the first implementation of the method that has led to the filter whose behavior is not satisfactory.

FIGS. 6A, 6B, 7A, 7B, 8A, 8B represent the respective evolutions of the gain (FIGS. 6A, 7A, 8A) and of the phase (FIGS. 6B, 7B, 8B) of the digital filter obtained step by step during one example of implementation of said parameterization method.

In this example of implementation, the frequencies F_E and F_T are respectively equal to 50 Hz and 7 Hz. The interval Ic corresponds here to [6.5 Hz, 7.5 Hz], and the value V is taken equal to 0 dB. In addition, the filter transfer function is sought in the form of a quotient N(z)/D(z), where N is of degree 2 and D is of degree 3 with poles all equal to each other.

FIG. 6A schematically represents the frequency evolution of the gain of the digital filter at the end of step 100 of calculating the parameterization method. As illustrated in FIG. 6A, the gain increases considerably, in absolute value, at the frequency F_T, which indeed corresponds to the expected behavior for the targeted attenuation.

FIG. 6B for its part schematically represents the frequency evolution of the phase of the digital filter at the end of step 100 of calculating the parameterization method. As illustrated in FIG. 6B, the phase of the filter is not yet controlled at this stage since it increases beyond 180° for frequencies above the frequency F_T.

Note that the zeros of N(z) determined at the end of step 100 are respectively equal to 0.637+i*0.771 and 0.637−i*0.771.

It is also noted that FIGS. 6A and 6B were obtained by simulation of the behavior of the digital filter, thanks to the parameterization device.

FIGS. 7A and 7B correspond to the respective updates of FIGS. 6A and 6B, once step 200 of updating the zeros has been performed.

As can be observed in FIG. 7A, the gain of the digital filter has decreased, in absolute value, in the vicinity of the frequency F_T, more specifically in the interval Ic. Nevertheless, this gain remains, in absolute value, greater than the amplitude of the torsional mode.

The phase, for its part, and as illustrated in FIG. 7B, has hardly evolved.

Furthermore, the updated zeros associated with the case of FIGS. 7A and 7B are respectively 0.606+i*0.732 and 0.606−i*0.732. A decrease of the module relative to the zeros obtained at the end of step 100 and associated with FIGS. 6A and 6B is therefore observed indeed.

FIGS. 8A and 8B correspond to the respective updates of FIGS. 7A and 7B, once step 300 of determining the poles has been performed. It is noted that at the end of step 300, the poles are all determined to be equal to 0.5.

As can be observed in FIG. 8A, the gain of the digital filter has increased, in absolute value, in the vicinity of the frequency F_T, more specifically in the interval Ic. Therefore, there is a very strong targeted attenuation on the torsional mode of the power transmission line. In addition, the gain remains below 0 dB in the bandwidth, which means that the digital filter modifies the low-frequency control signal very slightly.

The phase, for its part and as illustrated in FIG. 8B, remains comprised, in absolute value, between 0° and 180° over the entire frequency spectrum envisaged (areas A, B and C), which allows avoiding any side effect during the execution of the monitoring loop, such as, for example, a too great phase shift which could lead to an inversion of the control signal.

In general, the invention remains of course applicable for a torsional mode positioned not in the area B but also in the area A or the area C.

The invention therefore allows advantageously parameterizing a digital filter in order to effectively attenuate the torsional mode of the power transmission line around the frequency of said torsional mode, without degrading the gain of the pre-existing monitoring loop on the remainder of the frequency spectrum, by limiting the phase shift effects introduced, and without any undesirable temporal behavior being introduced into the pre-existing regulation logic. In addition, the parameterization method allows obtaining a very efficient digital filter of reasonable order, typically less than 5, for example equal to 3, which is compatible with a real-time implementation in the pre-existing regulation logic.

Finally, it should be noted that a transfer function associated with a digital filter parameterized according to the invention is easily implemented in pre-existing regulation software. To this end, those skilled in the art have access to libraries of functions allowing them to generate such a digital filter at the output of the control device 22 of the monitoring loop.

The invention claimed is:

1. A method for parameterizing a digital filter for the attenuation of a torsional mode of a power transmission line of an aircraft turbine engine, said mode being associated with a frequency F_T comprised in a confidence interval Ic, the digital filter being of the low-pass type and:
comprising a z transfer function which is causal, stable and equal to a quotient N (z)/D (z), where N and D are polynomial functions, N being of degree strictly greater than 1,
intended to be integrated into a pre-existing monitoring loop of the turbine engine, so as to filter control signals generated by a control device of said loop and sampled at a frequency F_E, said loop being closed and associated with a bandwidth in which a gain of the loop is increased, in absolute value, by a value V,
said method being implemented by a parameterization device and including:
a step of calculating, as a function of the frequencies F_T and F_E, complex numbers forming zeros of N (z), so that the filter attenuates the frequency F_T,
a step of updating the zeros of N (z), so that a gain of the filter satisfies, in the confidence interval Ic, a first predetermined gain template as a function of an amplitude of the torsional mode, and
a step of determining real numbers forming poles of D (z), so that, in the bandwidth of the loop:
a phase of the filter satisfies a predetermined phase template as a function of the frequency F_E,
the gain of the filter satisfies a second predetermined gain template as a function of the value V.

2. The method according to claim 1, wherein the step of updating the zeros of N (z) includes a sub-step of reducing the respective modules of the zeros at a predetermined pitch, the reduction sub-step being executed iteratively as long as the first amplitude template is not satisfied.

3. The method according to claim 1, wherein the poles of D (z) are all considered equal to each other, the pole determination step including:
a sub-step of selecting a pole comprised strictly between −1 and 1,
a sub-step of translating the selected pole along a real axis and at a predetermined pitch, so as to obtain a translated pole,
said translation sub-step being executed iteratively as long as the phase template and the second gain template are not satisfied, the pole selected during an iteration corresponding to the translated pole obtained during the previous iteration.

4. The method according to claim 1, wherein the first gain template corresponds to an increase, in the confidence interval Ic, of the value of the gain by an opposite of the amplitude of the torsional mode.

5. The method according to claim 1, wherein the phase template corresponds to an increase in a phase shift introduced by the filter in the bandwidth of the closed loop.

6. The method according to claim 1, wherein the degree of N (z) is equal to 2, so as to obtain, during the calculation step, zeros z_1 and z_2 according to the following formulation:

$$z\_1=\exp((2\times i\times \pi \times F\_T)/F\_E) \text{ and } z\_2=\exp((-2\times i\times \pi \times F\_T)/F\_E).$$

7. The method according to claim 1, wherein the degree of D (z) is equal to 3.

8. The method according to claim 1, wherein the frequency F_T and the confidence interval Ic are determined beforehand during a series of tests on a test bench of dynamic behavior of the power transmission line.

9. The method according to claim 1, said method including, following the step of determining real numbers forming poles of D (z), a step of validating temporal behavior of the digital filter, said validation step consisting in verifying that a temporal response of the filter to a step signal is monotonously increasing, the pole D (z) determination step and the validation step being iterated as long as the behavior of the digital filter is not validated.

10. A monitoring system intended to be on board an aircraft including a turbine engine, said turbine engine comprising a power transmission line having a torsional mode associated with a frequency F_T comprised in a confidence interval Ic, said system including means for receiving a setpoint relating to a predetermined parameter, a control device configured to generate control signals sampled at a frequency F_E and means for measuring said parameter, said monitoring system forming a closed monitoring loop associated with a bandwidth in which the gain is increased, in absolute value, by a value V, wherein the monitoring loop includes a digital filter parameterized by means of a method in accordance with claim 1, said digital filter being integrated into said loop so as to filter the control signals.

11. An aircraft including a turbine engine, said turbine engine comprising a power transmission line having a torsional mode associated with a frequency F_T comprised in a confidence interval Ic, said aircraft further including a monitoring system according to claim 10.

12. A non-transitory computer readable medium having stored thereon instructions which, when they are executed by a processor, configure said processor to implement a parameterization method according to claim 1.

13. A device for parameterizing a digital filter, said filter being intended to attenuate a torsional mode of a power transmission line of an aircraft turbine engine, said mode being associated with a frequency F_T comprised in a confidence interval Ic, the digital filter being of low-pass type and:
described by a z transfer function which is causal, stable and equal to a quotient N (z)/D (z), where N and D are polynomial functions, N being of degree strictly greater than 1,
intended to be integrated into a pre-existing monitoring loop of the turbine engine, so as to filter control signals generated by a control device of said loop and sampled at a frequency F_E, said loop being closed and associated with a bandwidth in which a gain of the loop is increased, in absolute value, by a value V,
said device including:
a processor configured to
calculate, as a function of the frequencies F_T and F_E, complex numbers forming zeros of N (z), so that the filter attenuates the frequency F_T,
update the zeros of N (z), so that the gain of the filter satisfies, in the confidence interval Ic, a first predetermined gain template as a function of the amplitude of the torsional mode, and
determine real numbers forming poles of D (z), so that, in the bandwidth of the loop:
the phase of the filter satisfies a predetermined phase template as a function of the frequency F_E,
the gain of the filter satisfies a second predetermined gain template as a function of the value V.

* * * * *